May 30, 1950  F. PERLIN  2,509,366
LIGHT METER HAVING REFLECTING MEANS TO RECEIVE
LIGHT FROM TWO OPPOSITE DIRECTIONS
Filed Aug. 25, 1947
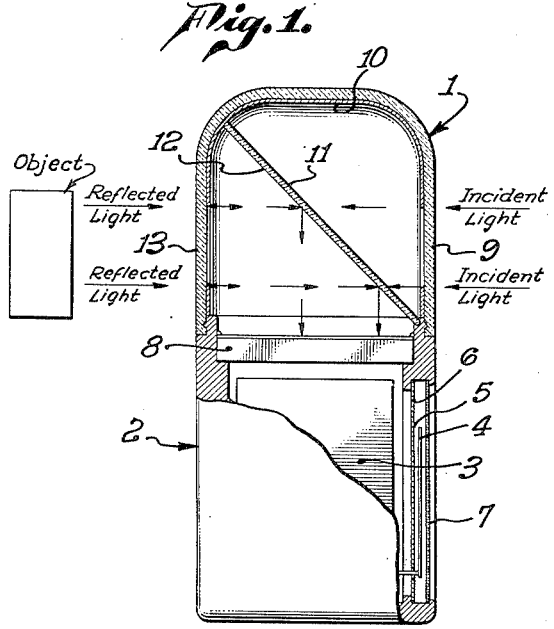
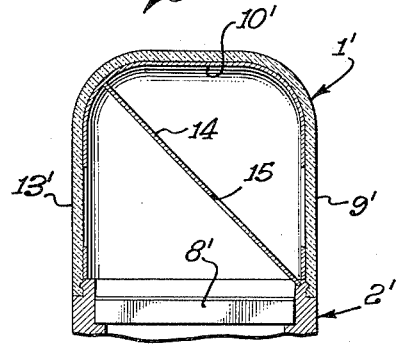
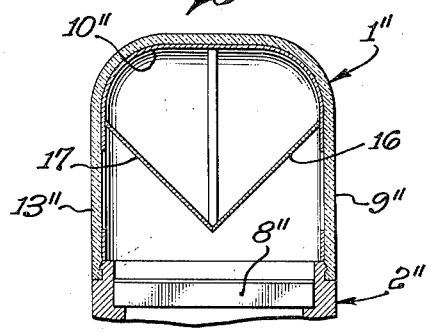
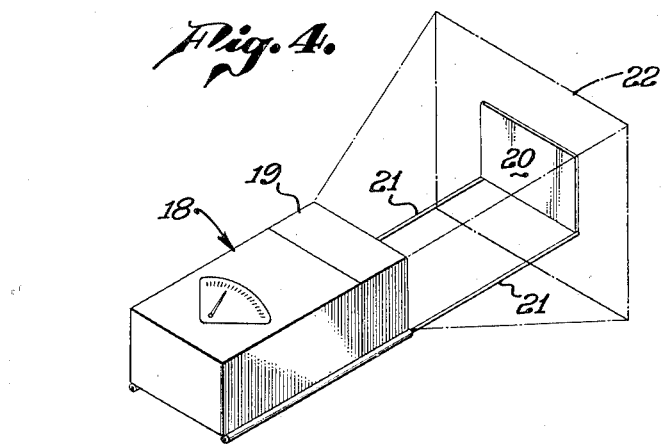
INVENTOR.
FRED PERLIN,
BY
ATTORNEY, Patented May 30, 1950

2,509,366

UNITED STATES PATENT OFFICE 2,509,366

LIGHT METER HAVING REFLECTING MEANS TO RECEIVE LIGHT FROM TWO OPPOSITE DIRECTIONS

Fred Perlin, Los Angeles, Calif.

Application August 25, 1947, Serial No. 770,427

11 Claims. (Cl. 88—23)

This invention relates generally to improved apparatus and method for use in regulating photographic exposure whereby the brightness range of the object or plurality of objects in a scene to be photographed may be effectively compressed if they exceed the linear portion of the H-D or Hurter-Driffeld curve, so as to fall on the linear portion of the said curve whereby the photographic reproduction will have brightness variations correctly related to one another so as to correspond to the brightness variations of the object or plurality of objects in the scene photographed.

The H-D curve referred to herein, as is well known in the art, is a graph of density as a function of exposure, where the ordinates correspond to density and are on a linear scale, and the abscissas correspond to exposure and are on a logarithmic scale. The H-D curve is positively curved in the region of small exposures and densities, is negatively curved in the region of large exposures and densities and is virtually linear therebetween. Further information may be obtained in any textbook on photography and sensitometry.

This invention is particularly applicable to the field of color photography, since, as is well known in the art, the emulsions used in chromatic or color photography are much more critical than those used in achromatic or ordinary black and white photography.

At the present time, in color photography it is necessary, generally speaking, to use "flat" lighting, that is, lighting directed on the objects to be photographed from a point closely adjacent to the camera so that the light rays are virtually parallel to the camera and illuminate the object or plurality of objects to be photographed in a manner casting virtually no shadows. This is necessary, because any very considerable variation in density of the photographic reproduction will cause a serious color error.

In certain cases where a plurality of objects has very different brightness values, even such flat lighting is not satisfactory, since the allowable range of photographic density variations is exceeded, thus resulting in considerable color error. Furthermore, in both color photography and black and white photography an imperfect reproduction results where the brightness variations of the scene photographed are of such range as to be broader than the linear portion of the H-D curve of the negative and positive emulsions used in making the photographic reproduction. This results in a serious loss of tone value in the reproduction. For example, in ordinary achromatic photography a scene including a grey tone, as viewed by the eyes, the grey tone will often appear as a black in the photographic reproduction with virtually complete loss of tone value and with an improper relationship thereof to the rest of the various densities of the photographic reproduction. Furthermore, suppose that in the event that a number of pictures are being taken of various objects of different brightness, it is difficult to determine what exposure to use in photographing the various objects so that the photographic reproductions thereof will each have the proper density value in relation to each other. For example, if a relatively bright object is photographed with an exposure determined by a prior-art type of exposure meter, and then a second photograph is made of a relatively dark object with an exposure determined by said exposure meter, the density of the photograph reproductions thereof will not be related to each other as the original objects were.

One type of prior art exposure meter has generally comprised an electrically responsive meter connected to a photo-sensitive cell of the boundary-layer type adapted to be placed a short distance in front of and facing various portions of a scene to be photographed. For example, light from both the brightest portions of the scene and the darkest portions of the scene may be separately and individually measured by such an exposure meter. Then the exposure of the whole scene may be determined so that the brightest or darkest portions will fall at any selected point on the H-D curve. However, generally speaking, the brightness range is of such breadth as to exceed the linear portion of the H-D curve and either the brightest portion or the darkest portion or both will have to be placed on non-linear curved portions of the H-D curve, thus resulting in an imperfect photographic reproduction of the scene photographed. This is a very great disadvantage in achromatic photography and is a fatal defect in color photography.

It will readily be understood that the median density of a whole series of photographic reproductions will all be properly related one to the other if the incident light illuminating each scene is exactly the same. For this purpose a photographic exposure meter of the type hereinbefore mentioned may be placed in front of each object in a scene to be measured and directed toward the illuminating incident light for determining the general light intensity on the scene but not the light reflected on the scene. However, this does not provide for proper tone value relationship at either the upper or lower portions of the H-D curve.

This invention, generally speaking, comprises apparatus and method for making photographic reproductions more faithfully reproducing the brightness variations of a scene to be photographed by effectively combining and measuring both incident light illuminating objects in the scene and reflected light from objects in the scene, in selected proportions, and varying the incident light on the various objects in the scene until the combined measured light equals a selected value, whereby to effectively compress the brightness range of the photographic reproduction to the linear portion of its H-D curve.

It can readily be understood that through the use of the apparatus of the present invention, all the prior art disadvantages mentioned hereinabove are avoided since the photographic reproductions will be on the linear portions of the H-D curve and thus correct density relationships will be maintained at all times. This is highly desirable in achromatic photography and absolutely essential in successful color photography.

With the above points in mind, it is an object of this invention to provide new and improved apparatus and method for faithfully reproducing the brightness variations of various objects in a scene photographed.

It is a further object of this invention to provide a photoelectric exposure meter adapted to combine and integrate selected proportions of light reflected from, and light illuminating, an object in a scene to be photographed.

It is a further object of this invention to provide apparatus and method in making photographic reproductions faithfully reproducing the brightness variations of the various objects in a scene to be photographed by effectively compressing the brightness range of the photographic reproduction to the linear portion of its H-D curve.

Other and allied objects will become apparent to those skilled in the art upon a careful examination, study, and analysis of the illustrations, specifications, and appended claims.

To facilitate understanding, reference will be had to the following illustrative drawings, in which:

Fig. 1 is a partial vertical section through one illustrative embodiment of this invention.

Fig. 2 is a fragmentary vertical section of a slightly modified form of the invention shown in Fig. 1.

Fig. 3 is a fragmentary vertical section through another illustrative embodiment of this invention.

Fig. 4 is a perspective view of another illustrative embodiment of the invention.

More specifically, referring to Fig. 1, a curved, closed, opaque hood 1 is mounted on a housing 2 adapted to contain electrically responsive means 3, which may be current responsive or voltage responsive, and provided with a visually observable, movable indicator 4, which is arranged to cooperate with visually observable indicia, indicated at 5, carried by a dial face 6. The indicator 4, indicia 5 and dial face 6 are all visually observable through a transparent window 7 in the rear side of the housing 2.

Horizontally positioned at the junction of the opaque hood 1 and the housing 2 is a photo-sensitive means 8, which may preferably, but not necessarily, be a photographic cell of the boundary layer type capable of generating voltages when light impinges the boundary layer, such as, for instance, a cuprous oxide cell or a selenium cell. The light-responsive, photo-voltaic means 8 is connected to the electrically responsive means 3 (microammeter or millivoltmeter) in a well-known manner. The opaque hood 1 is provided with a front translucent portion 13 and a rear, translucent portion 9 which, in the examples shown, are aligned. These translucent portions may be of any suitable material. For example, opal glass may be utilized and, in fact, the entire hood may be formed of opal glass with all portions thereof other than the portions 13 and 9 coated with an opaque material, such as indicated generally at 10 for rendering same opaque, if desired. Various other constructions may also be employed.

Angularly positioned within the hood 1 is a partially transparent mirror 11 having a reflecting surface 12 angularly facing the forward translucent portion 13 and also angularly facing the upper surface of the photo-sensitive means 8, whereby light reflected from an object in the scene to be photographed may enter the hood 1 through the transparent portion 13 and be reflected from the mirror 11 onto the upper surface of the photo-sensitive means 8, as indicated by the arrows. The rear translucent portion 9 receives a portion of the incident light illuminating the object, since the entire unit is held in front of the object and a short distance therefrom, with window 13 facing the object being photographed and 9 facing the camera. The portion of the incident light entering the translucent portion 9 and passing through the mirror 11 and reflected from the inside wall of the translucent portion 13 backwardly onto the reflecting side 12 of the mirror 11 is thence downwardly directed onto the upper surface of the photo-sensitive means also, as indicated by the arrows.

It can be seen that since only a relatively small portion of the incident light will be reflected from the inside wall of the translucent portion 13 backwardly onto the reflecting surface 12 of the mirror 11, a relatively small portion of the incident light will impinge the photosensitive means 8 in comparison with a relatively larger portion of the light reflected from the object and the reflecting surface 12 of the mirror 11 onto the upper surface of the photo-sensitive means 8. The effective proportion of the incident light and the reflected light which actually impinges the photo-sensitive means 8 may be adjusted in a number of ways. For example, the translucency of the portions 13 and 9 may be varied, if desired. The size of the translucent portions may be varied, if desired, by suitable masking or otherwise, and various other means may be employed for proportioning the incident and reflected light received by the photo-sensitive means 8. This adjustment will vary, depending upon the photographic emulsions used, as more fully explained hereinafter.

The combined reflected and incident light received by the photo-sensitive means 8 is translated by the photo-sensitive means 8 into corresponding electrical variations which, in turn, are translated by the electrically responsive means 3 into corresponding positions of the indicator 4 with respect to the dial face 5, which may be visually observed through the transparent window 7.

The operation of the device may be described as follows. The apparatus is placed closely adjacent the object to be photographed, with the front translucent portion 13 positioned a short distance therefrom so as to not have too wide a field of view reflecting light through the translucent portion 13 into the hood 1. Then the indicator 4 is observed. Previously, the meter has been calibrated to correspond with the emulsions being used so that a certain selected reading of the indicator 4 with respect to the indicia 5 will place the brightness range of the objects to be photographed on the desired linear portion of the H-D curve.

Now if the reading observed from an object in a scene to be photographed is other than the selected reading, the lighting on that object may be varied until a reading within a desired range is observed. If this is done for various objects in the scene, when the photographic reproduction is made, all the objects will be in their correct tonal relationships, since the whole brightness range lies on the linear portion of the H-D curve. This applies to principal objects in the scene to be photographed. Shadows may cause a lesser reading to be observed on the meter, say for example, half of the selected reading for the rest of the scene. This effectively results in expanding the brightness range for said shadows, thus achieving the desired contrast. This last arrangement is purely optional and may be employed where such effects are desired.

Fig. 2 illustrates a slightly modified form of the apparatus shown in Fig. 1. Instead of using a partially transparent mirror, such as mirror 11 shown in Fig. 1, a perforated, burnished plate 14 may be utilized. As can readily be seen, this acts in a manner similar to the mirror 11 shown in Fig. 1, since the major portion of the light reflected from an object to be photographed and passing through the translucent portion 13' will be reflected from the burnished plate 14 onto the upper surface of the photo-sensitive means 8'. A small portion of the incident light passing through the rear translucent portion 9' will pass through the central aperture 15 in the burnished plate 14 and be reflected from the inside wall of the front translucent portion 13 back onto the burnished plate 14 and thence downward onto the upper surface of the photo-sensitive means 8'. The balance of the device operates in a manner similar to that shown in Fig. 1 and described hereinabove.

Fig. 3 illustrates another embodiment of the invention in illustrative form. In this case the optical means employed comprises two mirror surfaces 16 and 17 angularly arranged between the front translucent portion 13'', and the rear translucent portion 9'', and arranged to downwardly direct light received through said translucent portions onto the upper surface of the photo-sensitive means 8''. The mirror surfaces 16 and 17 may be individual mirrors or they may be formed integrally if desired and may be mounted in any suitable manner. The proportioning of the incident and reflected light received by the photocell 8'' may be arranged by masking the translucent portions, mirror surfaces, or portions of the photocell. In other respects, this embodiment of my invention is similar to that hereinbefore described.

It should, of course, be understood that any suitable reflecting means may be employed to reflect the light rays entering the device through the translucent portions and direct them onto the photosensitive surface.

Fig. 4 illustrates another embodiment of the invention functioning in accordance with the same principles employed in the previous embodiments of this invention, although of somewhat different construction. In this case any standard photoelectric exposure meter, such as that indicated generally at 18, may be employed. The exposure meter 18 is provided with view angle-restricting means which, in the example shown, comprises a shield 19 but which may take the form of a narrow angle lens or a plurality of parallel plates or a grillage or other type of view angle-limiting means. This is for the purpose of limiting the angle of view of light received by the exposure meter 18 to an area a selected amount greater than a white or light grey card 20 carried at a fixed distance from the exposure meter 18 on an extensible support, such as 21, which may comprise telescoping tubes and rods placing card 20 at a predetermined distance from the meter. The operation of this arrangement is as follows. The exposure meter 18 is placed in front of an object to be photographed, with the standard white card 20 placed in contact with, or immediately in front of, the object. In Fig. 4 that portion of the object embraced by the field of view of meter 18 is represented by the dash line square 22. It can readily be seen that the incident light illuminating the object 22 also illuminates the standard white card 20, which is reflected into the exposure meter together with light reflected from predetermined area of the object 22 between the card and dash line limit. It can be seen that since the standard white card 20 is of a certain selected size in comparison with a field of view of the photoelectrical exposure meter, the light reflected from said card 20 corresponds to the incident light and is in a proportion or ratio to the light reflected from the object 22, corresponding to their respective areas. Thus, in effect, exactly the same result is obtained as that obtained with the previous embodiments of this invention hereinbefore described. It should be noted that light reflected from the standard card 20 will be considered and referred to hereinafter as incident light, and light reflected from the object 22 will, as hereinbefore indicated, be referred to as reflected light.

In actual practice, the transparency of mirror 12, the translucency of ports 9 and 13, the size of port 15, or the masks used over the cell, are so arranged that a reading of 2.5 to 3.5 as high is obtained for light entering through the port 13 as the reading obtained for light of same intensity entering through port 9.

Numerous modifications and variations of this invention are possible within the scope and spirit, therefore, and will occur to those skilled in the art, and all such are intended to be included and comprehended herein.

In order to adapt the device for indoor and outdoor use, for use in high intensity and low key illumination, etc., each level being represented by a separate row of indicia readable by means of a single index 4, suitable masks may be interposed over the entire area of the light-sensitive cell 8. Such mask may consist of a member rotatable on an axis parallel to the apex of mirrors 16 and 17 (Fig. 3) and between such apex and the cell, so that when the member is perpendicular to the cell plane, all of the light impinges on the cell, and when the member is at a predetermined angle to the cell plane, only a portion of the light impinges the cell, thereby permitting accurate readings even when higher intensity illumination is used. The structure of the device may be varied within wide limits. Various types of photo-sensitive means other than the boundary layer type of cell may be used.

The examples described and illustrated herein are exemplary and illustrative only and are not intended to limit the scope of this invention, which is to be interpreted in the light of the appended claims only.

I claim:

1. A photoelectric exposure meter for use in photography, comprising: an opaque hood provided with two aligned, translucent portions in opposite sides thereof, one of said portions being adapted to diffusedly admit light reflected from an object to be photographed and the other of said portions being adapted to diffusedly admit incident light illuminating the object; a partially transparent mirror angularly positioned between said translucent portions with the reflective side facing the light reflected from the object; a single photo-sensitive cell of the photo-voltaic type positioned out of alignment with said translucent portions and in a position to receive light reflected from the object and the reflective side of the mirror, and that portion of the incident light which passes through the partially transparent mirror and is reflected from the opposite inside wall of the hood back to the reflective side of the mirror, whereby the electrical output of the photo-sensitive cell will correspond to the sum of the light reflected from the object and actually impinging the photo-sensitive cell and that portion of the object illuminating incident light actually impinging the photo-sensitive cell; and electrically-responsive indicating means for visually indicating the response of the photo-sensitive cell.

2. A photoelectric exposure meter for use in photographpy, comprising: an opaque hood provided with two aligned, translucent portions in opposite sides thereof, one of said portions being adapted to admit light reflected from an object to be photographed and the other of said portions being adapted to admit incident light illuminating the object; a substantially V-shaped mirror means positioned between said translucent portions with one reflective side thereof angularly facing the translucent portion admitting incident light and the other reflective side thereof angularly facing the translucent portion admitting light reflected from the object; a single photo-sensitive cell positioned to receive reflected light and incident light from the mirror, whereby the electrical output of the photo-sensitive cell will correspond to the sum of the light reflected from the object and actually impinging the photo-sensitive cell and that portion of the incident light actually impinging the photo-sensitive cell; and electrically-responsive indicating means for visually indicating the response of the photo-sensitive cell.

3. A photoelectric exposure meter for use in photography, comprising: an opaque hood provided with two aligned, translucent portions in opposite sides thereof, one of said portions being adapted to diffusedly admit light reflected from an object to be photographed and the other of said portions being adapted to diffusedly admit incident light illuminating the object; a partially transparent mirror angularly positioned between said translucent portions with the reflective side angularly facing the light reflected from the object; a single photo-sensitive cell positioned out of alignment with said translucent portions and adapted to receive light reflected from the object and the reflective side of the mirror and that portion of the incident light which passes through the partially transparent mirror and is reflected from the opposite inside wall of the hood back to the reflective side of the mirror, whereby the electrical output of the photo-sensitive cell is an integrated response to both incident and reflected light; said translucent portions of the hood, said mirror and said photocell being so arranged as to effectively proportion the incident light impinging the photocell and the reflected light impinging the photocell to a selected ratio whereby the density range of a photographic reproduction of the scene will lie on the linear portion of the H-D curve when the combined light impinging the photocell is within a predetermined range of values; and electrically-responsive indicating means for visually indicating the response of the photo-sensitive cell.

4. In an exposure meter for use in photography, the combination of: a photo-sensitive cell; means for directing light reflected from an object to be photographed onto the photo-sensitive cell, said means including a reflector and a light receiving means positioned on the meter to receive light from one side thereof; means operative at the same time such reflected light is being directed onto the cell for also receiving and transmitting to the same cell incident light falling from any direction upon the aspect of the object to be photographed, said last named means including a reflector and a light receiving means positioned on the meter and facing its other side; and means for visually indicating the response of said cell to the incident light falling upon the object to be photographed as modified by the light reflected therefrom, both in the same sense.

5. In a light meter for use in photography: a photo-electric cell; light receiving and reflecting means for directing light approaching the meter from one side thereof onto the photo-sensitive surface of said cell; light receiving and reflecting means for directing light approaching the meter from the opposite side of the meter onto the photo-sensitive surface of said cell; whereby upon placement of the meter closely in front of an object to be photographed with one of said light receiving means facing the object and the other facing away from the object, the response of the electric cell is a measure of the incident light which falls upon the aspect of the object to be photographed as modified by the light reflected therefrom electrically responsive means for visually indicating the response of the photo-electric cell; and means connecting said electrically responsive means with the cell in such a manner that all light reaching the photo-sensitive surface of the cell causes said means to respond in the same sense.

6. A light meter for use in photography, comprising: an opaque hood having a pair of translucent windows in opposite sides thereof; a single photo-sensitive cell extending across the bottom of the hood with its receiving surface normal to the longitudinal axis of the hood; means for reflecting light transmitted by both of said translucent windows onto substantially the entire surface of the sensitive cell; and means for visually indicating the cumulative response of the photo-sensitive cell to the light admitted through both translucent windows, whereby upon placement of the meter closely in front of an object to be photographed with one of its windows facing the object and the other facing away from the object, the indication obtained is a measure of the incident light which falls upon the aspect of the object to be photographed as modified by the light reflected therefrom.

7. A light meter for use in photography, comprising: an opaque hood having a pair of translucent windows in opposite sides thereof, one of said windows being adapted to diffusedly admit light reflected from an object to be photographed and the other of said windows being adapted to diffusedly admit incident light from all angles at its side of the hood; a single photo-sensitive cell extending across the bottom of the hood with its receiving surface normal to the longitudinal axis of the hood; reflector means angularly positioned within the hood between said translucent windows and adapted to reflect the light diffusedly transmitted by them onto the photo-sensitive cell; and means for visually indicating the cumulative response of the photo-sensitive cell to the light admitted through both translucent windows.

8. A light meter for use in photography, comprising: a casing having opposite sides; light diffusing windows in said opposite sides, said windows being substantially parallel to the longitudinal axis of the casing; a photo-sensitive element in the casing with its receiving surface substantially normal to said longitudinal axis of the casing; light reflecting means within the casing for directing light entering one of the windows onto said photo-sensitive surface; light reflecting means within the casing for directing light entering the other window onto the photo-sensitive surface; whereby, upon placement of the meter in front of an object to be photographed with one of said windows facing the object, incident light falling upon the aspect of the object to be photographed and light reflected from the object are both impinged upon the photo-sensitive surface to activate it; and means for visually indicating the integrated response of said photo-sensitive surface to said two types of light.

9. A light meter for use in photography, comprising: a photoelectric cell having a photo-sensitive surface lying generally in a plane; light reflecting means above the photo-sensitive surface facing two opposite directions parallel with the general plane of the photo-sensitive surface for simultaneously directing onto said surface light which approaches the meter from said two opposite directions; and means for visually indicating the cumulative response of the photo-sensitive cell to the light approaching the meter from said two opposite directions.

10. The light meter defined in claim 9 further characterized by the fact that a part of the said light reflecting means is disposed at an angle of substantially 45° to the general plane of the photo-sensitive surface and faces said surface.

11. A light meter for use in photography, comprising: a casing having opposite sides; a photo-sensitive element having a light receiving surface within the casing; a light admitting and directing system within the casing defining an optical path, said system comprising windows in said opposite sides of the casing substantially parallel to the longitudinal axis of the casing, light diffusing means adjacent to the windows for diffusing light entering the same, light reflecting means for directing light entering one of said windows onto the light receiving surface of the photosensitive element and light reflecting means for directing light entering the other window onto the light receiving surface of the photosensitive element, said light receiving surface being substantially normal to that portion of the optical path of the system across which the light receiving surface extends; whereby upon placement of the meter in front of an object to be photographed with one of said windows facing the object, incident light falling upon the object to be photographed and light reflected from the object are both impinged upon the light receiving surface of the photo-sensitive element to activate the same; and means for visually indicating the integrated response of said photosensitive element to said two types of light.

FRED PERLIN.

REFERENCES CITED

The following references are of record in the file of this patent:

UNITED STATES PATENTS

| Number | Name | Date |
| --- | --- | --- |
| 1,990,396 | Ballard | Feb. 5, 1935 |
| 2,023,159 | Wright | Dec. 3, 1935 |
| 2,198,971 | Neufeld | Apr. 30, 1940 |
| 2,294,876 | Walker | Sept. 1, 1942 |
| 2,378,433 | Riszdorfer | June 19, 1945 |
| 2,389,617 | Freund | Nov. 27, 1945 |

OTHER REFERENCES

Ser. No. 357,992, Riszdorfer (A. P. C.), published May 4, 1943.